United States Patent [19]
Schmidt et al.

[11] Patent Number: 5,648,582
[45] Date of Patent: Jul. 15, 1997

[54] STABLE, ULTRA-LOW RESIDENCE TIME PARTIAL OXIDATION

[75] Inventors: Lanny D. Schmidt, Minneapolis, Minn.; Daniel A. Hickman, Midland, Mich.

[73] Assignee: Regents of the University of Minnesota

[21] Appl. No.: 564,935

[22] Filed: Nov. 30, 1995

Related U.S. Application Data

[63] Continuation of Ser. No. 110,408, Aug. 20, 1993, abandoned.

[51] Int. Cl.$^6$ .................. C07C 4/02; C07C 5/42; C07C 5/48
[52] U.S. Cl. .......... 585/652; 585/500; 585/621; 585/627; 585/648; 585/653; 585/660
[58] Field of Search .................. 585/621, 627, 585/648, 652, 653, 660

[56] References Cited

U.S. PATENT DOCUMENTS

| | | | |
|---|---|---|---|
| 4,087,259 | 5/1978 | Fujitani et al. | 48/212 |
| 4,844,837 | 7/1989 | Heck et al. | 252/373 |

FOREIGN PATENT DOCUMENTS

| | | |
|---|---|---|
| WO90/06282 | 6/1990 | WIPO . |
| WO90/06297 | 6/1990 | WIPO . |

*Primary Examiner*—Ponnathapura Achutamurthy
*Attorney, Agent, or Firm*—Kenneth H. Johnson

[57] ABSTRACT

A process for the catalytic partial oxidation of methane in gas phase at very short residence time (800,000 to 12,000,000 hr$^{-1}$) by contacting a gas stream containing methane and oxygen with a metal supported catalyst, such as platinum deposited on a ceramic monolith.

14 Claims, 3 Drawing Sheets

STABLE, ULTRA-LOW RESIDENCE TIME PARTIAL OXIDATION

This is a continuation of application Ser. No. 08/110,408, filed Aug. 20, 1993, now abandoned. Priority of the prior application is claimed pursuant to 35 USC §120.

BACKGROUND

Catalytic partial oxidation of hydrocarbons results in a gas product containing varying proportions of hydrogen, carbon monoxide, carbon dioxide, and other components. Steam reforming of hydrocarbons also results in a gas product of similar composition. The above gas products are hereafter referred to as "synthesis gas" and the present invention is related to its production by catalytic partial oxidation of hydrocarbons. In addition, whenever the process steps of partial oxidation or steam reforming are referred to, such steps refer to the catalytic partial oxidation or steam reforming of hydrocarbons.

Commercial production of hydrogen, ammonia, and methanol depends primarily on the use of synthesis gas produced by steam reforming combined with additional downstream process steps. The steam reforming reaction is an endothermic reaction and can be represented by the reaction of methane with water, as follows:

$$CH_4 + H_2O \rightarrow CO + 3H_2 \qquad (1)$$

Partial oxidation, on the other hand, is an exothermic reaction, which can be represented by the reaction of methane with oxygen, as follows:

$$CH_4 + \tfrac{1}{2}O_2 \rightarrow CO + 2H_2 \qquad (2)$$

An undesirable secondary reaction may occur in catalytic partial oxidation, where oxygen may react with hydrogen to produce $H_2O$, and subsequently form carbon dioxide.

The formation of carbon dioxide by catalytic partial oxidation and steam reforming occurs as a secondary reaction, to those indicated as (1) or (2). That secondary reaction is the exothermic water gas shift reaction, as follows:

$$CO + H_2O \rightarrow CO_2 + H_2 \qquad (3)$$

The selectivities of catalytic partial oxidation and steam reforming to produce the various proportions of hydrogen, carbon monoxide, carbon dioxide, and water are controlled by several factors, but one of the most important of these factors is the choice of catalyst composition. Difficulties have arisen in the prior art in making such a choice economical. Typically, catalyst compositions have included precious metals and/or rare earths. The large volumes of expensive catalysts needed by prior art catalytic partial oxidation processes have placed those processes generally outside the limits of economic justification. However, for the following reasons, steam reforming remains a very expensive process for production of synthesis gas as well.

To produce synthesis gas by steam reforming, high temperature heat input is primarily required at two process steps. First, sufficient steam at a high temperature and high pressure must be generated for mixing with the hydrocarbon feedstock and, secondly, the steam reforming of the steam and hydrocarbon mixture must take place at relatively high temperatures and pressures through a bed of solid catalyst. The equipment needed for these two heat transfers at high temperature and high pressure is necessarily quite expensive. The equipment for the steam reforming step is also costly because it must be adapted to permit the changing the solid catalyst when that catalyst is spent or poisoned. Heat sources appropriate for the above two process steps are typically provided by fired heaters at high, continuing utility costs, also with high fluegas NOx production consequential to the high temperatures required in the furnace firebox.

Prior art has suggested that synthesis gas production by catalytic partial oxidation could overcome some of the above disadvantages and costs of steam reforming, as follows: "Production of Methanol from Hydrocarbonaceous Feedstock", PCT Application No. PCT/US89/05369 to Korchnak et al (International Publication No. WO 90/06282)(Korchnak et al '369) and "Production of Methanol from Hydrocarbonaceous Feedstock", PCT Application No. PCT/US89/05370 to Korchnak et al (International Publication No. WO 90/06297)(Korchnak et al '370) each describe an identical process for catalytic partial oxidation. The asserted advantages of Korchnak et al '369 and '370 are relatively independent of catalyst composition, i.e. in Korchnak et al '369 the authors state that " . . . partial oxidation reactions will be mass transfer controlled. Consequently, the reaction rate is relatively independent of catalyst activity, but dependent on surface area-to-volume ratio of the catalyst." (pp. 11–12). A monolith catalyst is used with or without metal addition to the surface of the monolith at space velocities of from 20,000–500,000 $hr^{-1}$. The suggested metal coatings of the monolith are selected from the exemplary list of palladium, platinum, rhodium, iridium, osmium, ruthenium, nickel, chromium, cobalt, cerium, lanthanum, and mixtures thereof in addition to metals of the groups IA, IIA, III, IV, VB, VIB, or VIIB. The catalyst surface area-to-volume ratio is in the range of 5–40 $cm_2/cm_3$. None of the detailed embodiments indicate any preference for metal coatings, specifically or in general. The feed mixture of methane and an oxygen-containing gas to the catalyst bed must be preheated to within 200° F. of the mixture's ignition temperature, but then the reaction proceeds autothermally. Steam is generally required in the feed mixture to suppress carbon formation on the catalyst. The conclusion reached by one skilled in the art is that Korchnak et al '369 and '370 attempt to solve the problem of high catalyst volumes and subsequent high costs in the use of catalytic partial oxidation by virtually eliminating the need for expensive metal coatings for the catalyst. The high catalyst volumes also require exceptional devices to attempt to evenly distribute the feed to the top of the catalyst bed, i.e., a number of tubes direct the flow of the feed gas to the top of the catalyst bed to reduce the severity of unstable operation through vapor phase combustion of the feed gas before it enters the catalyst bed.

U.S. Pat. No. 4,844,837 to Heck et al (Heck et al '837) discloses a catalytic partial oxidation method for methane using a monolith catalyst with platinum-palladium, palladium-rhodium, or platinum-rhodium coatings. There is a specific teaching "that the palladium-rhodium and platinum-rhodium combinations are rather ineffective for methane oxidation." (col. 8, ll. 28–30). The exclusion of rhodium from the monolith catalyst coating is highly preferred. The catalyst bed path required for the feed gas conversion described in this patent is calculated to be approximately one meter long.

U.S. Pat. No. 4,087,259 to Fujitani et al (Fujitani et al '259) describes a monolith catalyst with a rhodium coating to perform catalytic partial oxidation on gasoline and heavier petroleum fractions. The catalyst bed must be externally heated to maintain the reaction and the maximum space velocity is about 110,000 $hr^{-1}$.

SUMMARY OF THE INVENTION

The present invention uses a structurally specific monolith catalyst coated with rhodium or nickel to achieve dramatic increases in space velocity for catalytic partial oxidation. Such dramatic increases in space velocity necessarily result in lower required catalyst volume while retaining the advantages in selectivity and conversion of using the expensive rhodium or nickel monolith coatings. The space velocity range for the present invention using methane in a reactor near atmospheric pressure is between 120,000–12,000,000 $hr^{-1}$. Optimum space velocities have been determined to be about 800,000–1,000,000 $hr^{-1}$.

The use of the above catalyst to increase space velocity has produced several surprising results. The mass transfer characteristics of the catalyst are so improved that preheating of the feed gas is no longer necessary, i.e., the reaction is so rapid at the catalyst surface that heat from the partial oxidation exothermic reaction is transferred almost instantaneously to the feed gas entering the catalyst monolith. Although preheating the feed mixture of methane and oxygen-containing gas improves conversion and selectivity, ambient temperature feed gas mixtures (25° C.) entering the monolith maintained at an autothermal temperature of about 1000° F. result in conversion and carbon monoxide and hydrogen selectivities at greater than 95%. In addition, although generally required in Korchnak et al '369 and '370 to prevent carbon formation on the catalyst, steam addition is not needed or preferred.

The thickness of the catalyst monolith through which the feed gas mixture must pass is from 1 mm to 2 cm for the present invention. For Korchnak et al '369 and '370, the catalyst monolith required to achieve its objects are determined to be almost one meter thick. The difference in catalyst monolith volumes between the present invention and the prior art is several orders of magnitude apart. Such small catalyst volumes in the present invention eliminate radial temperature variation, i.e. hot spots, typical of all relatively thick catalyst beds.

Ceramic foam monoliths have been found, in the present invention, to create the superior mass transfer characteristics resulting in such dramatic increases in space velocity. Although metal gauzes or extrudates are effective as monoliths to achieve the objects of the present invention, ceramic foam monoliths are preferred where hydrogen production is the desired process use of the synthesis gas. Although the monolith geometries and orientation contribute to the enhanced mass transfer increasing space velocities for the present invention, the high space velocities themselves also add to maximizing the mass transfer coefficients at the monolith catalyst surfaces. Rhodium or nickel loadings on the monoliths of 1 to 15 percent as applied by washcoats is the preferred metals content range.

The reactor is started from ambient temperatures through the use of a mixture of light hydrocarbons or ammonia and air preheated to about 200° C. and then introduced to the monolith catalyst, or an appropriate temperature at which combustion will occur. After combustion has established a monolith catalyst temperature of near 1000° C., preheat and use of the mixture of light hydrocarbons or ammonia and air is stopped. The feed gas mixture of methane and an oxygen-containing gas is then fed to the monolith catalyst is begun at a mixture temperature of from 25° C. to 450° C.

The concept of Korchnak et al '369 and '370 is especially susceptible to unstable operation resulting from dominance of the vapor phase combustion reaction taking place in the preheated feed gas mixture. Such combustion reactions result in carbon dioxide and water as products, reducing the selectivity for hydrogen and carbon monoxide in partial oxidation processes with unstable operation. The elimination of high temperature preheating of the feed gas mixture in the present invention solves this problem. The feed gas mixture in the present invention does not require preheating to near its ignition temperature prior to introduction to the metal-coated catalyst.

In addition, because the catalyst volumes of the present invention are so small, they may be economically be contained in tubes. Thus, the feed gas distribution problems encountered in applying the concept of Korchnak et al '369 and '370 are eliminated for the present invention.

Although for ease in comparison with prior art, space velocities at standard conditions will be used to describe the present invention. It is well recognized in the art that residence time is the inverse of space velocity and that the disclosure of high space velocities equates to low residence times. The present invention has been demonstrated, for low pressure applications at a monolith catalyst temperature range from 850° C. to 1150° C., to perform optimally in the range of from $10^{-2}$ to $10^{-4}$ seconds.

DETAILED DESCRIPTION OF THE INVENTION

Referring to FIGS. 1A–B, 2A–D, and 3A–D, the experimental apparatus developed for actual use of the present invention will now be discussed as a specific embodiment. For the purposes of this detailed description section, rhodium will be used as exemplary of similar results of the present invention to be obtained through the use of nickel as applied to monolith catalysts. The use of the term monolith catalyst is not intended as a specific limitation on catalyst structure to attain the objects of the present invention. As described above, metallic gauze or metal coated gauze may also be used efficiently. Extrudates may also be used if sufficient mass transfer across the boundary layer to the catalyst surface may be attained in a manner similar to that achieved by the ceramic foams.

A small, adiabatic reactor has been constructed to approximate the conditions of an industrial scale reactor. As constructed and shown in FIG. A, the reactor tube 100 is an insulated quartz tube with an 18 mm diameter. The reactor tube 100 contains a monolith catalyst disk 101 located so that the feed gas mixture 102 flows through the monolith catalyst disk 101. For this specific embodiment, the monolith catalyst disk 101 is 10 mm thick, cylindrical, and composed of alumina foam monolith (about 30–80 ppi, preferably 80 ppi) with rhodium deposited thereon by rhodium washcoats. In addition, the alumina foam monolith is an open, cellular, sponge-like structure cut into 17 mm cylinders. Generally, the rhodium content of the monolith catalyst disk 101 is between 0.1–20 weight percent. For this specific embodiment, rhodium content of the monolith catalyst disk is 9.8 weight percent.

Also for this specific embodiment, another metal coating is used for the monolith catalyst disk 101 so that its comparative performance in catalytic partial oxidation can be measured at high space velocities. Platinum is applied at 11.6 weight percent to a similar alumina foam monolith with 50 ppi and with a length of 7 mm and a diameter of 17 mm. That platinum coated monolith catalyst is subjected to feed gas mixture 102 compositions described above at appropriate conditions in monolith catalyst disk 101 so as to provide comparison with the results from use of the rhodium-coated monoliths.

Figure 1A:
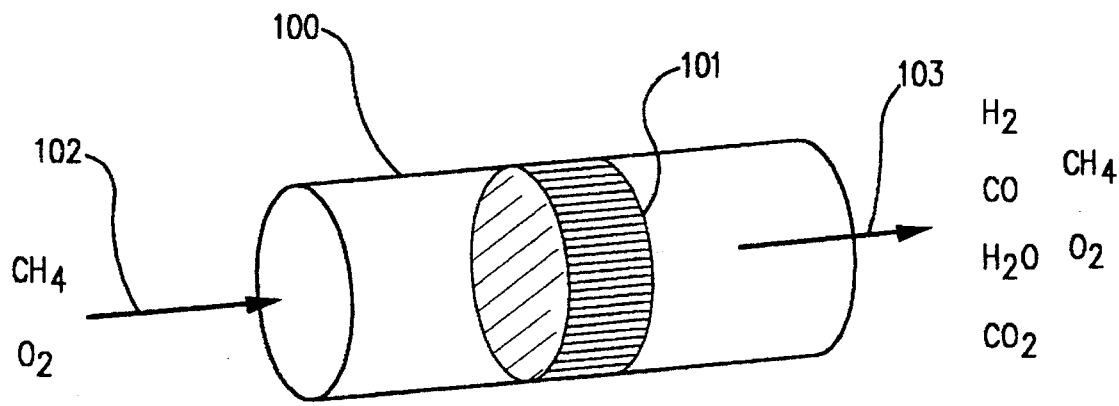
FIG. 1A is a drawing of the reactor of the present invention with a cylindrical disk of monolith catalyst within a passage for a feed gas mixture of methane and an oxygen containing gas.

For both the rhodium and platinum coated monolith catalyst disks, feed gas mixture 102 is comprised of either (1) light hydrocarbons or ammonia and an oxygen-containing gas for initial heating of monolith catalyst disk 101 as described above or (2) methane and an oxygen-containing gas (CH4 and O2 respectively in FIG. 1A). The feed gas mixture of type (2) is introduced to the reactor tube 100 at 25° C. or 460° C. during continuous operation after start-up. The temperature of the monolith catalyst disk 101 is within the range of 850°–1150° C. corresponding to the range of inlet temperatures for the feed gas mixture 102, i.e., 25°–460° C. The pressure at which the feed gas mixture 102 reacts with the monolith catalyst disk 101 is 1.4 atmospheres.

Feed gas mixture 102 was prepared using air and pure oxygen as the oxygen-containing gas. The results for use of pure oxygen as the oxygen-containing gas, as in the description of FIGS. 3A–D above, are reported only for a monolith catalyst disk 101 with 9.8 weight percent rhodium.

Now referring to FIGS. 2A–D, it is apparent that the Heck et al conclusion is incorrect that rhodium would yield less favorable results as a monolith catalyst than platinum. Using preheat temperature of 25° C. for feed gas mixture 102, the highest hydrogen and carbon monoxide selectivities ($S_{H2}$ and $S_{CO}$ respectively) attainable for platinum are 0.43 and 0.89 respectively. The rhodium monolith catalyst hydrogen and carbon monoxide selectivities are 0.73 and 0.89 respectively. Selectivities are defined as:

$$S_{H2} = \frac{0.5 F_{H2}}{F_{CH4,in} - F_{CH4,out}} = \frac{0.5 F_{H2}}{F_{H2} + F_{H2O} + 2F_{C2H4} + 3F_{C2H6}}$$

-continued
and $$S_{CO} = \frac{F_{CO}}{F_{CH4,in} - F_{CH4,out}} = \frac{F_{CO}}{F_{CO} + F_{CO2} + 2F_{C2H4} + 3F_{C2H6}}$$

where $F_i$ is the molar flow rate of species i.

Figure 2A:
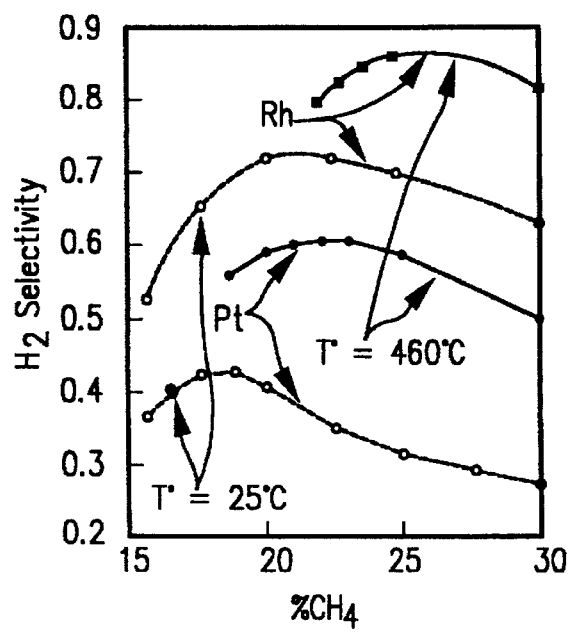
FIG. 2 illustrates the results of (A) hydrogen and (B) carbon monoxide selectivities, (C) methane conversion, and (D) autothermal temperatures for a 50 ppi×7 mm, 11.6 wt % Pt monolith and an 80 ppi (pore per inch)×10 mm, 9.8 wt % Rh monolith as a function of a range of volume percent methane in the feed gas mixture composition and the feed gas mixture preheat temperatures for a total flow rate of 4 standard liters per minute (slpm) methane and air (as the oxygen-containing gas). Squares represent Rh, circles represent Pt, open symbols represent feed gas mixture temperature of 25° C., and filled symbols represent a feed gas mixture temperature of 460° C.
Figure 2B:
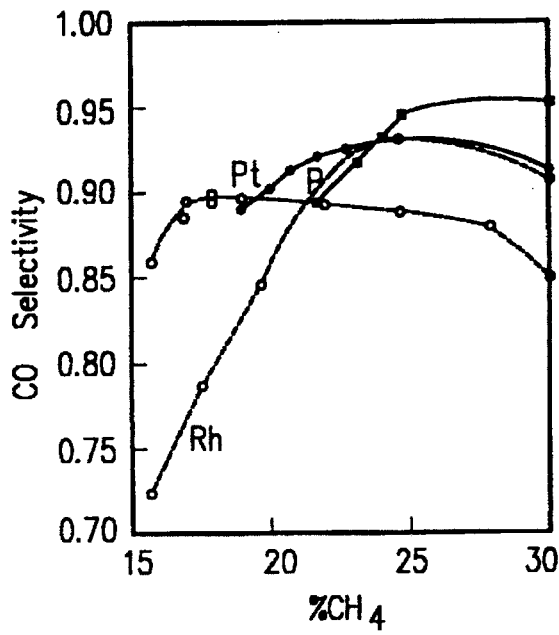
Figure 2C:
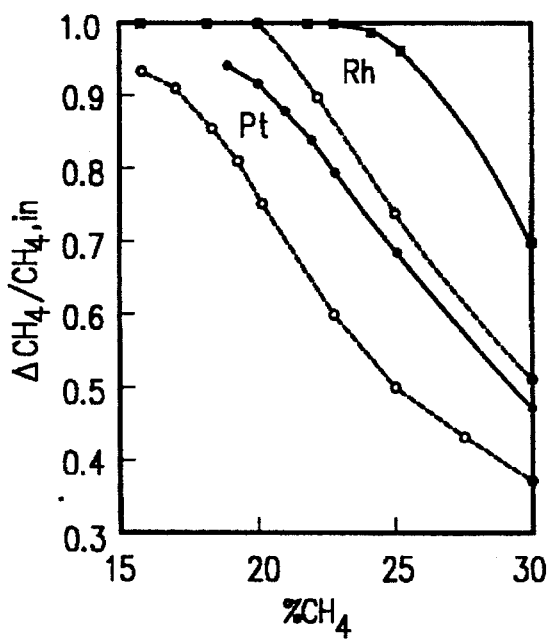
Figure 2D:
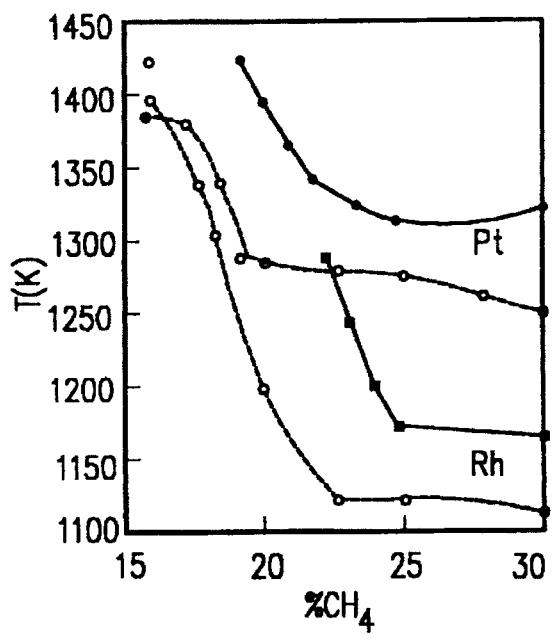

It is also apparent with respect to FIGS. 2A–B that increasing the feed gas mixture 102 preheat temperature improves hydrogen and carbon dioxide selectivities for both rhodium and platinum coated monolith catalysts.

Figure 1B:
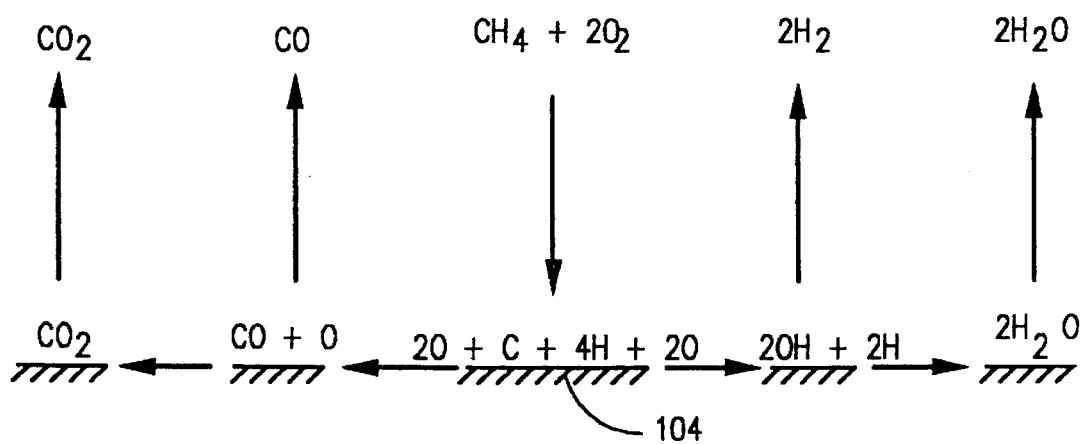
FIG. 1B is a schematic drawing of the adsorption, desorption, and surface reaction steps occurring on the monolith catalyst of the present invention.

Referring now to FIG. 1B, note from the progress of reactants on monolith catalyst surface 104 that the measure of efficiency of the catalytic partial oxidation reaction in forming hydrogen and carbon monoxide depends (1) on the degree to which the methane and oxygen combine on the catalyst surface and the initial partial oxidation products (CO+O and 2OH+2H to form carbon monoxide and hydrogen respectively) are removed before they further react to ultimately form carbon dioxide and water and (2) on the degree to which the monolith catalyst surface reactions take place over mere vapor phase combustion of the feed gas mixture which form carbon dioxide and water. The rapid mass transfer to and from monolith catalyst surface 104 is thus one of the most important aspects of the present invention. That rhodium has such superior efficiency to platinum in causing the partial oxidation reaction at the same space velocities is shown in FIGS. 2A–B by higher selectivities, in FIG. 2C by higher conversion of methane at equivalent methane concentrations in the feed gas mixture, and in FIG. 2D by such higher selectivities and methane conversions achieved at lower monolith catalyst temperatures.

Figure 3A:
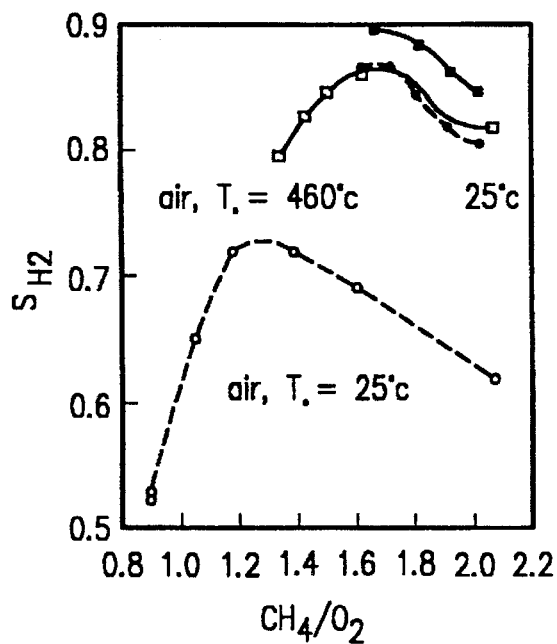
FIG. 3 illustrates the results of (A) hydrogen and (B) carbon monoxide selectivities, (C) methane conversion, and (D) autothermal temperatures as a function of a range of methane to oxygen ratios for an 80 ppi×10 mm, 9.8% Rh monolith using air (open symbols) and pure oxygen (closed symbols) as the oxygen-containing gas of the feed gas mixture at a total flow rate of 4 standard liters per minute (slpm) methane and oxygen-containing gas. Circles represent a feed gas preheat temperature of 25° C. Closed squares represent a feed gas preheat temperature of 300° C. Open squares represent a feed gas preheat temperature of 460° C.
Figure 3B:
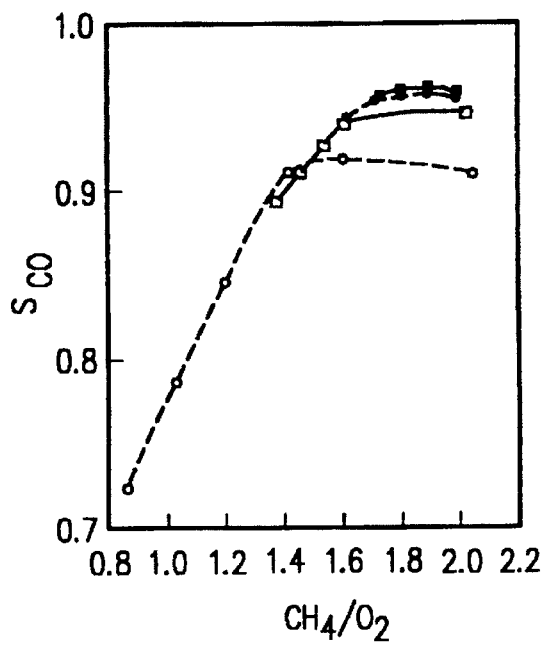

The superior results shown in FIGS. 3A–D for the use of pure oxygen instead of air as the oxygen-containing gas are generally consistent with the similarly superior results using a preheat temperature of 460° C. instead of 25° C. The hydrogen and carbon monoxide selectivities of FIGS. 3A–B are improved for the use of pure oxygen over that of air. The amount of that improvement is, for a feed gas mixture preheat temperature of 25° C., approximately the same improvement shown in FIGS. 2A–B for increasing the preheat temperature from 25° C. to 460° C. Preheat temperatures of 300° C. for feed gas mixtures using pure oxygen as the oxygen-containing gas achieve hydrogen selectivities of up to 90 percent and carbon monoxide selectivities of up to 96 percent.

Figure 3C:
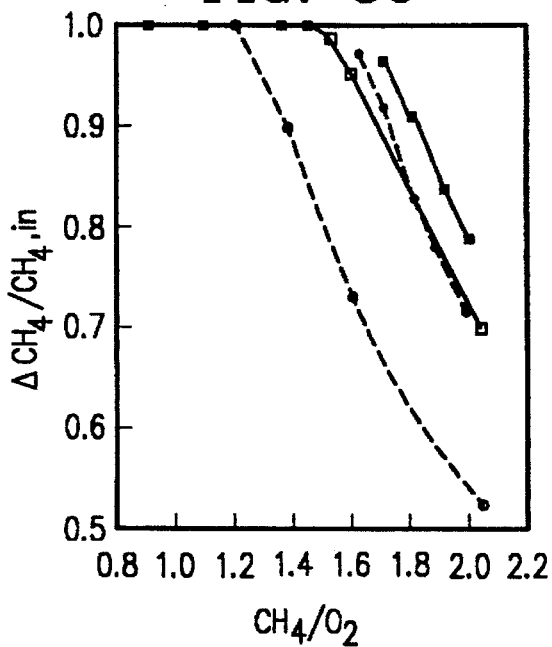
Figure 3D:
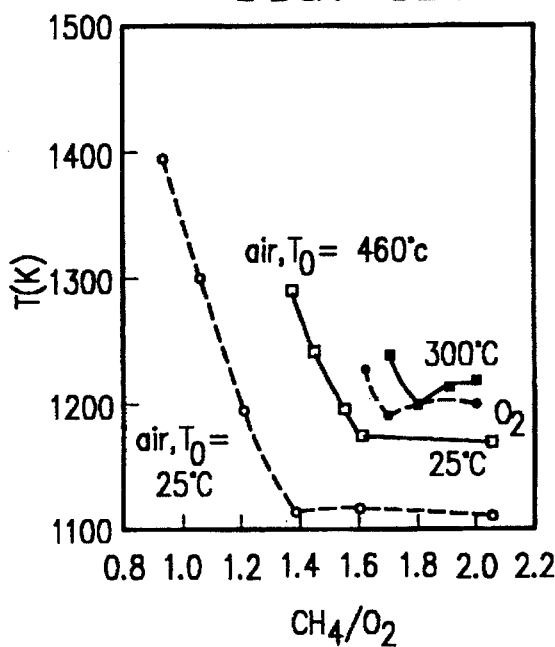

FIG. 3C presents data showing that the use of pure oxygen, as opposed to air, as an oxygen-containing gas improves methane conversion at equivalent methane to oxygen ratios by as much as 19 percent. FIG. 3D presents data showing that the use of pure oxygen, as opposed to air, as an oxygen-containing gas increases the monolith catalyst temperature by as much as 90° K., thus improving selectivities and methane conversion. The nitrogen in air is non-reacting and becomes a heat sink for the exothermic reactions in the monolith catalyst. To the extent that nitrogen is desirable in a downstream process or that an oxygen-rich gas not an economical choice for the oxygen-containing gas, air provided as the oxygen-containing gas for a feed gas mixture at 25° C. to the monolith catalyst accomplishes dramatic improvements over the prior art in catalyst volume reduction, hydrogen and carbon monoxide selectivities and methane conversion.

We claim:
1. A process for catalytic partial oxidation comprising:
   a) providing a feed gas mixture consisting essentially of methane and an oxygen-containing gas selected from the group consisting of air, a gas containing a higher molar proportion of oxygen than air and pure oxygen;

b) providing a supported metal catalyst, wherein the metals are one or more selected from the group consisting of rhodium, nickel, and platinum;

c) passing the feed gas mixture over the supported metal catalyst at a space velocity within the range of 800,000 $hr^{-1}$ to 12,000,000 $hr^{-1}$; and d) autothermally heating the supported metal catalyst.

2. The process of claim 1 wherein the space velocity is within the range of 800,000 $hr^{-1}$ to 1,000,000 $hr^{-1}$.

3. The process of claim 1 wherein the supported metal catalyst comprises said metal in the range of 0.1 to 20 weight percent.

4. The process of claim 1 wherein hydrogen is formed and in the process hydrogen selectivity is within the range of 87 to 90 percent at a feed gas mixture temperature in the range of 25° C. to 300° C.

5. The process of claim 1 wherein the autothermal heating maintains the supported metal catalyst at a temperature within the range of 850° C. to 1150° C.

6. The process of claim 1 wherein the supported metal catalyst is contained within a tube and provided with means to prevent bypassing of the feed gas mixture.

7. The process of claim 1 wherein the process forms hydrogen and wherein hydrogen selectivity is within the range of 73 to 87 percent at a feed gas mixture temperature range of 25° C. to 460° C.

8. A process for producing synthesis gas by an autothermal oxidation of hydrocarbons, comprising passing a feed gas mixture containing a hydrocarbon and oxygen over a ceramic foam supported metal catalyst at a gas hourly space velocity of from 800,000 $hr^{-1}$ to 12,000,000 $hr^{-1}$ and a temperature of rom 850°–1150° C., said metal catalyst being selected from the group consisting of rhodium, nickel and platinum.

9. The process of claim 8 wherein said metal catalyst is rhodium.

10. The process of claim 8 wherein said feed gas mixture contains steam.

11. The process of claim 8 wherein said ceramic foam comprises a porous monolithic material having a void volume of at least 50%.

12. The process of claim 8 wherein said ceramic foam comprises a porous monolithic material formed in a wafer about 10 mm thick.

13. A process for direct formation of synthesis gas by oxidation of methane with an oxygen containing gas comprising;

providing a feed gas mixture consisting essentially of methane and an oxygen-containing gas selected from the group consisting of air, a gas containing a higher molar proportion of oxygen than air and pure oxygen;

providing a supported metal catalyst, wherein the metals are one or more selected from the group consisting of rhodium, nickel, and platinum;

passing the feed gas mixture over the supported metal catalyst at a space velocity within the range of 800,000 $hr^{-1}$ to 12,000,000 $hr^{-1}$ to provide direct oxidation to synthesis gas with selectivity to hydrogen and carbon monoxide; and autothermally heating the supported metal catalyst.

14. A process for the formation of synthesis gas containing primarily carbon monoxide and hydrogen comprising the steps of passing a gas stream consisting essentially of methane and oxygen over a supported metal catalyst at a gas hourly space velocity of between 800,000 $hr^{-1}$ to 12,000,000 $hr^{-1}$ and autothermally heating the supported metal catalyst to selectively react said methane with said oxygen to produce primarily carbon monoxide and hydrogen, said metal being one or more selected from the group consisting of rhodium, nickel and platinum.

* * * * *

UNITED STATES PATENT AND TRADEMARK OFFICE
CERTIFICATE OF CORRECTION

PATENT NO.: 5,648,582
DATED: July 15, 1997
INVENTOR(S): Lanny D. Schmidt et al.

It is certified that error appears in the above-identified patent and that said Letters Patent is hereby corrected as shown below:

Col. 1, line 3, please insert the following --The present invention was made with government support from the U.S. Department of Energy under Contract No. DE-FG02-88ER13878. The Government has certain rights in this invention.--

Signed and Sealed this

Fifteenth Day of December, 1998

Attest:

BRUCE LEHMAN

Attesting Officer

Commissioner of Patents and Trademarks